United States Patent
Lott et al.

(10) Patent No.: US 6,383,556 B2
(45) Date of Patent: May 7, 2002

(54) METHOD FOR FORMING A MEMBRANE ELECTRODE DIFFUSION ASSEMBLY FOR USE IN AN ION EXCHANGE MEMBRANE FUEL CELL

(75) Inventors: David R. Lott; P. David DeVries, both of Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 0 days.

(21) Appl. No.: 09/792,085

(22) Filed: Feb. 23, 2001

Related U.S. Application Data

(63) Continuation-in-part of application No. 09/577,407, filed on May 17, 2000.

(51) Int. Cl.$^7$ .............................. H02M 8/10; B05D 5/12
(52) U.S. Cl. ...................... 427/115; 502/101; 429/30
(58) Field of Search .............................. 429/30, 33, 44; 427/115; 502/101

(56) References Cited

U.S. PATENT DOCUMENTS

| | | | | |
|---|---|---|---|---|
| 5,346,780 A | * | 9/1994 | Suzuki | 429/42 |
| 5,399,184 A | * | 3/1995 | Harada | 29/623.4 |
| 5,607,785 A | * | 3/1997 | Tozawa et al. | 429/33 |
| 6,030,718 A | * | 2/2000 | Fuglevand et al. | 429/32 X |
| 6,106,965 A | * | 8/2000 | Hirano et al. | 429/30 |

FOREIGN PATENT DOCUMENTS

| | | | |
|---|---|---|---|
| EP | 935304 | * | 8/1999 |
| EP | 955687 | * | 11/1999 |

* cited by examiner

*Primary Examiner*—Steve Kalafut
(74) *Attorney, Agent, or Firm*—Wells St. John P.S.

(57) ABSTRACT

A method for forming a membrane electrode diffusion assembly for use in an ion exchange membrane fuel cell is described and which includes, providing an ion conducting electrolyte membrane having opposite sides; and applying a first diffusion layer to one of the opposite sides of the ion conducting electrolyte membrane by the application of force sufficient to fabricate a resulting membrane electrode diffusion assembly which has an optimal operational temperature range when utilized in an ion exchange membrane fuel cell of less than about 95 degrees C.

21 Claims, 2 Drawing Sheets

METHOD FOR FORMING A MEMBRANE ELECTRODE DIFFUSION ASSEMBLY FOR USE IN AN ION EXCHANGE MEMBRANE FUEL CELL

RELATED PATENT DATA

This application is a continuation in part of application Ser. No. 09/577,407 which was filled on May 17, 2000.

BACKGROUND OF THE INVENTION

1. Field of the Invention

The present invention relates to a method for forming a membrane electrode diffusion assembly for use in an ion exchange membrane fuel cell.

2. Description of the Prior Art

The operation of fuel cells are well known. In this regard, a fuel cell generates electricity from a fuel source, such as hydrogen gas, and an oxidant such as oxygen or air. The resulting chemical reaction does not result in a burning of the fuel, therefore the thermodynamic limits on the efficiency of such a chemical reaction are much greater than conventional power generation processes. In a proton exchange membrane fuel cell the fuel gas (hydrogen) is ionized on one electrode, and the hydrogen ions diffuse across the membrane to recombine with oxygen ions on the cathode. The resulting byproduct of the reaction is water and the production of an electrical current.

In U.S. Pat. No. 6,030,718, the teachings of which are incorporated by reference herein, a proton exchange membrane fuel cell power system is disclosed and which includes discrete and novel proton exchange membrane fuel cell modules which are self humidifying and which employ a membrane electrode diffusion assembly which provides increased reliability and other advantages not possible heretofore with respect to fuel cell designs which have been primarily directed to stack-type arrangements. While this prior art patent discloses a method of producing a suitable membrane electrode diffusion assembly which operates with a great deal of success, the inventors have endeavored to improve upon this inventive concept by focusing further investigation on a method of manufacturing a membrane electrode diffusion assembly which increases the performance, and versatility of same and which further may be utilized in a modular design such as disclosed in this previous patent, or which may be also utilized in more traditional stack-type arrangements.

Accordingly, a method for forming a membrane electrode diffusion assembly for use in an ion exchange membrane fuel cell which achieves the benefits to be derived from the aforementioned teaching is the subject matter of the present invention.

SUMMARY OF THE INVENTION

One aspect of the present invention is to provide a method for forming a membrane electrode diffusion assembly for use in an ion exchange membrane fuel cell which includes providing an ion conducting electrolyte membrane having opposite sides; and applying a first diffusion layer to one of the opposite sides of the ion conducting electrolyte membrane by the application of force sufficient to fabricate a resulting membrane electrode diffusion assembly which has an optimal operational temperature range when utilized in an ion exchange membrane fuel cell of less than about 95 degrees C.

Another aspect of the present invention relates to a method for forming a membrane electrode diffusion assembly for use in an ion exchange membrane fuel cell which includes providing an ion conducting electrolyte membrane having opposite anode and cathode sides; affixing an anode and cathode electrode on the respective anode and cathode sides; positioning a first diffusion layer on one of the anode and/or cathode sides of the ion conducting electrolyte membrane and in covering relation over the respective anode and/or cathode electrode; and applying a force of at least about 400 pounds to about 10,000 pounds per square inch to the first diffusion layer to affix the first diffusion layer on the ion conducting electrolyte membrane to form a resulting membrane electrode diffusion assembly.

Yet further, another aspect of the present invention relates to a method of forming a membrane electrode diffusion assembly for use in an ion exchange membrane fuel cell, and which includes, first, providing an ion conducting electrolyte membrane having opposite anode and cathode sides; second, providing anode and cathode electrodes which are individually affixed on and located at least in partial covering relation relative to the respective anode and cathode sides of the electrolyte membrane; third, providing a first diffusion layer comprising carbon and a fluropolymer, and then heating the first diffusion layer to a temperature of about 100 degrees C. to about 500 degrees C. for a predetermined period of time in an oxygen-containing environment; fourth, affixing the previously heated first diffusion layer in at least partial covering relation relative to each of the anode and cathode electrodes by the application of pressure in the amount of about 400 pounds to about 10,000 pounds per square inch of surface area of the first diffusion layer; providing a permeable substrate having a predetermined thickness dimension and opposite sides; preparing a slurry comprising at least about 20% to about 90% by weight of a particulate carbon and a hydrophobic binding resin dispersed in a water solution which may include surfactant, and applying the slurry to coat one of the sides of the permeable substrate; air drying the coated side of the porous substrate, and after the step of air drying the coated side, applying additional coats of the slurry, each separated by the aforementioned air drying step, to form a second diffusion layer having a resulting hydrophobic gradient; and positioning the second diffusion layer in juxtaposed covering relation relative to the first diffusion layer.

These and other aspects of the present invention will be discussed in further detail hereinafter.

DETAILED DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
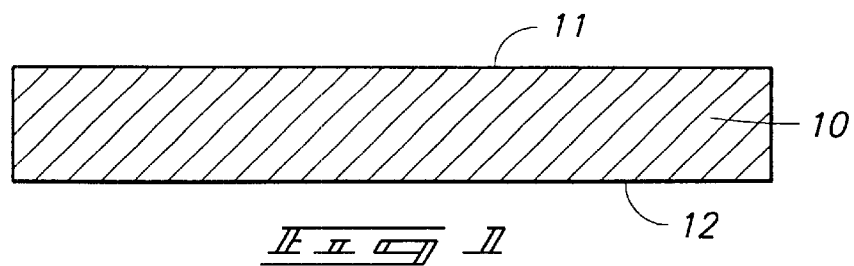
FIG. 1 is a greatly enlarged, diagrammatic section of a membrane electrode diffusion assembly shown at one processing step in accordance with the present invention.

Referring now to FIG. 1, an ion conducting electrolyte membrane having opposite sides 11 and 12 is shown. In the context of this document the term "ion conducting electrolyte membrane" is defined as a proton or anion conducting membrane either alone, or in combination with other materials. As seen in FIG. 1 side 11 is the anode side, and side 12 is designated as the cathode side. As discussed in U.S. Pat. No. 6,030,718 a suitable proton-conducting membrane may be purchased from the W. L. Gore Company under the trade designation Primea 6000 series. Of course any membrane which allows for the movement of protons or anions across the membrane interface may be potentially suitable for use.

Figure 2:
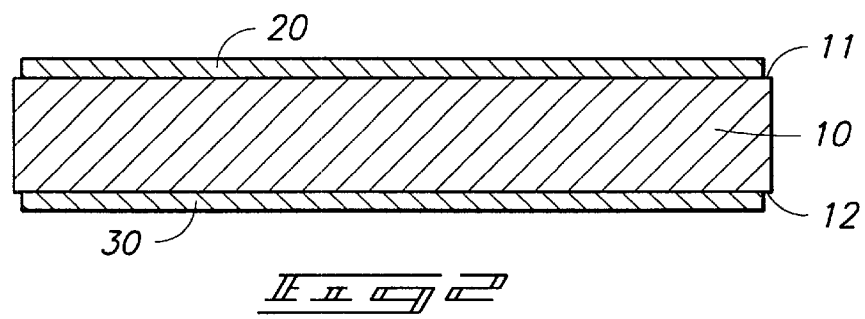
FIG. 2 is a greatly enlarged, diagrammatic section of a membrane electrode diffusion assembly shown at a processing step subsequent to that shown in FIG. 1.

Referring now to FIG. 2, the ion conducting electrolyte membrane is shown at a second step in the method wherein individual anode and cathode electrodes designated by the numerals 20 and 30 are affixed on the opposite anode and cathode sides 11 and 12, respectively, thereby placing them in ionic contact with the underlying ion conducting electrolyte membrane 10. As seen, the anode and cathode electrodes are located at least in partial covering relation relative to the respective anode and cathode sides 11 and 12 of the electrolyte membrane. The anode and cathode electrodes are provided before any of the following steps are conducted.

Figure 3:
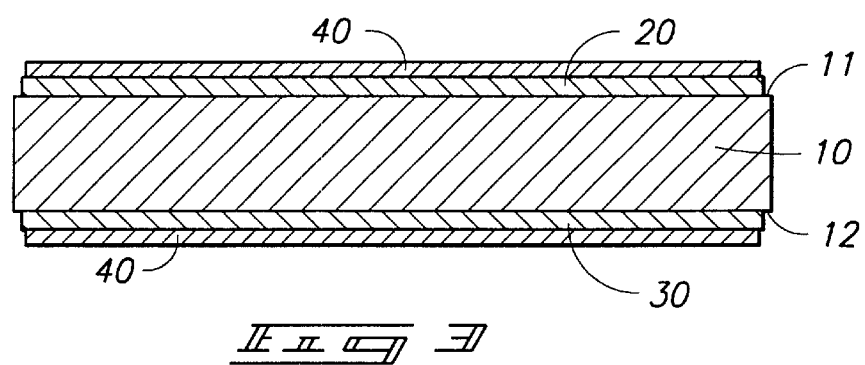
FIG. 3 is a greatly enlarged, diagrammatic section of a membrane electrode diffusion assembly shown at a processing step subsequent to that shown in FIG. 2.

Referring now to FIG. 3, following the step of providing the anode and cathode electrodes 20 and 30 which are individually affixed on, and located at least in partial covering relation relative to, the respective anode and cathode sides of the electrolyte membrane, the method further includes providing a first diffusion layer 40 which comprises carbon and a fluropolymer. This first diffusion layer is first heated to a temperature of about 100 degrees C. to about 500 degrees C. in an oxygen-containing environment such as air for a predetermined period of time which lies in a range of about 1 second to about 2 minutes. Subsequent to the heating step noted above, the first diffusion layer is positioned at least in partial covering relation relative to each of the anode and cathode electrodes 20 and 30 and is affixed thereto by the application of pressure in the amount of about 400 pounds to about 10,000 pounds per square inch of surface area of the first diffusion layer. The carbon portion of the first diffusion layer 40 is selected from the group consisting essentially of carbon cloth, carbon paper or carbon sponge or a suitable equivalent. Yet further, the fluropolymer is selected from the group consisting essentially of perfluorinated hydrocarbons or suitable equivalents. The resulting combination of these two materials results in a first diffusion layer 40 which is rendered substantially hydrophobic. It should be recognized that in the step of affixing the first diffusion layer 40 to the underlying anode and cathode electrodes 20 and 30 that such first diffusion layer 40 may be attached first to the anode, or alternatively to the cathode electrode, or further may be attached simultaneously to both the anode and cathode electrodes by the application of a force of about 400 pounds to about 10,000 pounds per square inch.

Figure 4:
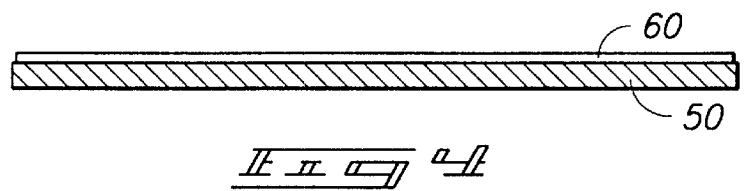
FIG. 4 is a greatly enlarged, diagrammatic section of a portion of a membrane electrode diffusion assembly at one processing step in accordance with the present invention.
Figure 5:
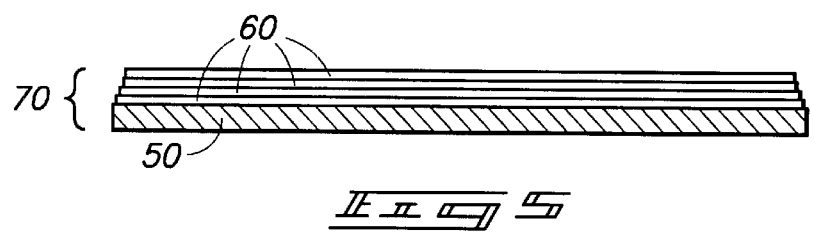
FIG. 5 is a greatly enlarged, diagrammatic section of a portion of a membrane electrode diffusion assembly shown at a processing step subsequent to that shown in FIG. 4.

Referring now to FIG. 4, a porous substrate 50 is provided and which is selected from the group consisting essentially of carbon cloth, carbon paper or carbon sponge or a suitable equivalent. The porous substrate 50 has a thickness of about 0.2 mm to about 2.0 mm. As seen in FIG. 4, and then subsequently in FIG. 5, a slurry is later prepared and which comprises at least about 20% to about 90% by weight of a particulate carbon and a hydrophobic binding resin dispersed in a water solution which may contain a small amount of a surfactant such as an alcohol. As seen in FIG. 4, the slurry 60 is applied to coat one of the sides of the permeable substrate 50. Thereafter, an air drying step is conducted to evaporate the water and any surfactant, and thereby deposit the particulate carbon and hydrophobic resin on the coated side. Thereafter, as seen in FIG. 5, additional coats of the slurry 60 are applied, each separated by the aforementioned air drying step to form a second diffusion layer 70 (FIG. 5) having a resulting hydrophobic gradient.

Figure 6:
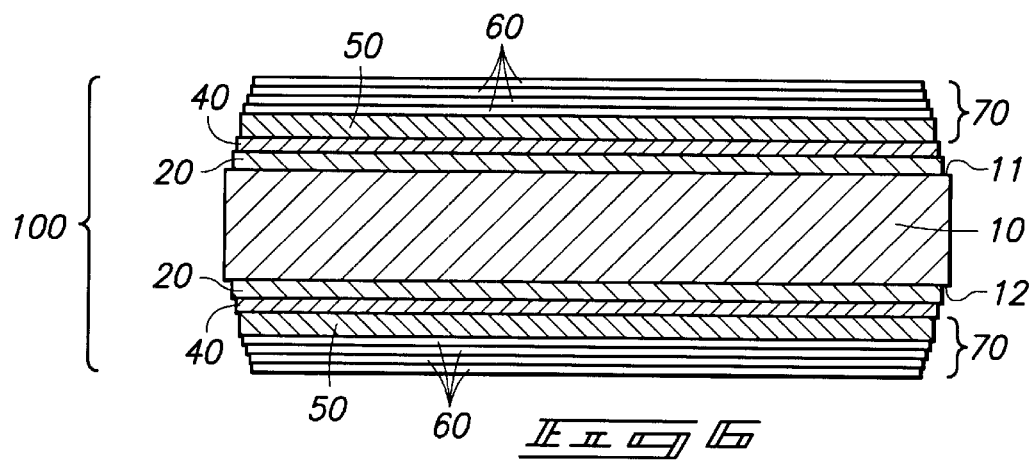
FIG. 6 is a greatly enlarged, diagrammatic section of a membrane electrode diffusion assembly at a processing step subsequent to that shown in FIG. 5.

Referring now to FIG. 6, it will be seen that the second diffusion layer 70 is positioned in juxtaposed covering relation relative to the first diffusion layer 40 and affixed thereto to form a resulting membrane electrode diffusion assembly 100. It should be understood that the hydrophobic binding resin selected for use in the second diffusion layer can be selected from the group including perfluorinated hydrocarbons.

OPERATION

The operation of the described embodiment of the present invention is believed to be readily apparent and is briefly summarized at this point.

Referring now to FIGS. 1–6, a method for forming a resulting membrane electrode diffusion assembly 100 (FIG. 6) for use in an ion exchange membrane fuel cell is illustrated, and in a first step, the method of the present invention includes providing an ion conducting electrolyte membrane 10 having opposite anode and cathode sides 11 and 12, respectively. Second, after providing the ion conducting electrolyte membrane, providing anode and cathode electrodes 20 and 30 respectively which are individually affixed on and located at least in partial covering relation relative to the respective anode and cathode sides of the electrolyte membrane 10. The method further includes, third, providing a first diffusion layer 40 comprising carbon and a fluropolymer and then heating the first diffusion layer to a temperature of about 100 degrees C. to about 500 degrees C. for a predetermined period of time in an oxygen-containing environment such as air. Following the heating of the first diffusion layer, affixing the previously heated first diffusion layer in at least partial covering relation relative to the anode and cathode electrodes 20 and 30 by the application of pressure in the amount of about 400 pounds to about 10,000 pounds per square inch of surface are of the first diffusion layer. As seen in FIG. 4, the method of the present invention further includes, providing a permeable substrate 50 having a predetermined thickness dimension and opposite sides. Following providing the permeable substrate, the method further includes preparing a slurry comprising at least 20% to about 90% by weight of a particular carbon and a hydrophobic binding resin dispersed in a water solution which may include a surfactant such as alcohol, and applying the slurry to coat one of the sides of the permeable substrate 50. Subsequently, the method further includes a step of air drying the coated side of the porous substrate, and after the step of air drying the coated side, applying additional coats of the slurry, each separated by the aforementioned air drying step, to form a second diffusion layer 70 (FIG. 5) having a resulting hydrophobic gradient. As seen in FIG. 6, and following the formation of the second diffusion layer 70, the method further includes positioning the second diffusion layer in juxtaposed covering relation relative to the first diffusion layer 40. This forms a resulting membrane electrode diffusion assembly 100 for use in an ion exchange membrane fuel cell.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for forming a membrane electrode diffusion assembly for use in an ion exchange membrane fuel cell, comprising:

providing an ion conducting electrolyte membrane having opposite sides;

providing anode and cathode electrodes individually disposed on the opposite sides of the ion conducting electrolyte membrane; and applying a first diffusion layer to one of the opposite sides of the ion conducting electrolyte membrane by the application of force sufficient to fabricate a resulting membrane electrode diffusion assembly which has an optimal operational temperature range when utilized in an ion exchange membrane fuel cell of less than about 95 degrees C., and wherein the first diffusion layer is applied to the side of the ion conducting electrolyte membrane bearing the anode electrode with a force of at least about 400 pounds to about 10,000 pounds per square inch.

2. A method as claimed in claim 1, and further comprising:

before the step of applying the first diffusion layer, providing a permeable substrate;

applying a porous layer thereto in the form of a slurry which comprises carbon and a hydrophobic binding resin to form a second diffusion layer which has a hydrophobic gradient; and positioning the second diffusion layer in covering relation relative to the first diffusion layer.

3. A method as claimed in claim 1, and further comprising:

before the step of applying the first diffusion layer, heating the first diffusion layer to a predetermined temperature.

4. A method as claimed in claim 1, and wherein the first diffusion layer comprises carbon and a fluropolymer, and wherein before the step of applying the first diffusion layer, heating the first diffusion layer to a temperature of about 100 degrees C. to about 500 degrees C. in the presence of air.

5. A method as claimed in claim 1, and further comprising:

providing a first diffusion layer which comprises carbon and a fluropolymer; and heating the first diffusion layer to a temperature of about 100 degrees C. to about 500 degrees C., and wherein after the step of heating the first diffusion layer, positioning the first diffusion layer in covering relation relative to the respective anode and cathode electrodes.

6. A method as claimed in claim 5, and further comprising:

after the step of applying the first diffusion layer, providing a permeable substrate; and applying a porous layer to the permeable substrate and which comprises at least about 20% to about 90% by weight of particulate carbon and a hydrophobic binding resin which forms a resulting second diffusion layer; and positioning the second diffusion layer in covering relation relative to the first diffusion layer.

7. A method as claimed in claim 6, wherein the step of applying the porous layer to the permeable substrate further comprises:

applying the porous layer in a slurry onto the permeable substrate in successive coats to form a hydrophobic gradient.

8. A method as claimed in claim 7, wherein each successive coat of the porous layer forming the second diffusion layer is air dried prior to the application of a subsequent coat.

9. A method for forming a membrane electrode diffusion assembly for use in an ion exchange membrane fuel cell, comprising:

providing an ion conduction electrolyte membrane having opposite sides;

providing anode and cathode electrodes individually disposed on the opposite side of the ion conducting electrolyte membrane; and applying a first diffusion layer to one of the opposite sides of the ion conducting electrolyte membrane by the application of force sufficient to fabricate a resulting membrane electrode diffusion assembly which has an optimal operational temperature range when utilized in an ion exchange membrane fuel cell of less than about 95 degrees C., and wherein the first diffusion layer is applied to the side of the ion conducting electrolyte membrane bearing the cathode electrode with a force of at least about 400 pounds to about 10,000 pounds per square inch.

10. A method for forming a membrane electrode diffusion assembly for used in an ion exchange membrane fuel cell comprising:

providing an ion conducting electrolyte membrane having opposite sides;

providing anode and cathode electrodes individually disposed on the opposite sides of the ion conducting electrolyte membrane; and applying a first diffusion layer to one of the opposite sides of the ion conducting electrolyte membrane by the application of force sufficient to fabricate a resulting membrane electrode diffusion assembly which has an optimal operational temperature range when utilized in an ion exchange membrane fuel cell of less than about 95 degrees C., and wherein the first diffusion layer is applied concurrently to both sides of the ion conducting electrolyte membrane with a force of at least about 400 pounds to about 10,000 pounds per square inch.

11. A method as claimed in claim 10, and further comprising:

after the step of providing the ion conducting electrolyte membrane and applying the first diffusion layer thereto, providing a permeable substrate; and applying a porous layer to the porous substrate to form a second diffusion layer.

12. A method as claimed in claim 10, and further comprising:

after the step of applying the first diffusion layer, providing a permeable substrate; and applying a porous layer to the permeable substrate and which comprises at least about 20% to about 90% by weight of particulate carbon and a hydrophobic binding resin which forms a second diffusion layer.

13. A method as claimed in claim 12, wherein the step of applying the porous layer to the permeable substrate to form the second diffusion layer further comprises:

applying the porous layer to the permeable substrate in the form of a slurry which is applied in successive coats to form a hydrophobic gradient.

14. A method for forming a membrane electrode diffusion assembly for use in an ion exchange membrane fuel cell, comprising:

providing an ion conducting electrolyte membrane having opposite sides;

providing anode and cathode electrodes individually disposed on the opposite sides of the ion conducting electrolyte membrane; and applying a first diffusion layer to one of the opposite sides of the ion conducting electrolyte membrane by the application of force sufficient to fabricate a resulting membrane electrode diffusion assembly which has an optimal operational temperature range when utilized in an ion exchange membrane fuel cell of less than about 95 degrees C., and wherein the first diffusion layer comprises carbon and a fluropolymer which is applied to both sides of the ion conducting electrolyte membrane, and in covering relation relative the respective anode and cathode electrodes with a force of at least about 400 to about 10,000 pounds per square inch.

15. A method for forming a membrane electrode diffusion assembly for use in an ion exchange membrane fuel, comprising:

providing an ion conducting electrolyte membrane having opposite anode and cathode sides;

affixing an anode and cathode electrode on the respective anode and cathode sides;

positioning a first diffusion layer on one of the anode or cathode sides of the ion conducting electrolyte membrane and in covering relation over the respective anode or cathode electrode; and applying a force of at least about 400 pounds to about 10,000 pounds per square inch to the first diffusion layer to affix the first diffusion layer on the ion conducting electrolyte membrane to form a membrane electrode diffusion assembly.

16. A method as claimed in claim 15, and wherein the membrane electrode diffusion assembly is incorporated into an ion exchange membrane fuel cell which has a cathode air flow, and wherein the ion exchange membrane fuel cell has a power output, and wherein the method further comprises:

exposing the cathode side of the membrane electrode diffusion assembly to the cathode air flow, and wherein the power output of the ion exchange membrane fuel cell is not substantially degraded upon exposure of the cathode side of the membrane electrode diffusion assembly to cathode air flow temperatures of less than about 95 degrees C.

17. A method as claimed in claim 16, and wherein the first diffusion layer comprises carbon and a fluropolymer, and wherein before the step of affixing the first diffusion layer the method further comprises:

heating the first diffusion layer to a temperature of about 100 C. to about 500 degrees C. in the presence of air.

18. A method as claimed in claim 17 and further comprising:

after the step of providing the ion conducting electrolyte membrane and affixing the first diffusion layer thereto, providing a permeable substrate; and applying a porous layer to the permeable substrate to form a second diffusion layer.

19. A method as claimed in claim 17, and further comprising:

after the step of applying the first diffusion layer, providing a permeable substrate; and applying a porous layer to the permeable substrate and which comprises at least about 20% to about 90% by weight of particulate carbon and a hydrophobic binding resin, and which forms a second diffusion layer.

20. A method as claimed in claim 19, wherein the step of applying the porous layer to the permeable substrate further comprises:

applying the porous layer in the form of a slurry to the permeable substrate in successive coats to form a resulting hydrophobic gradient in the second diffusion layer.

21. A method for forming a membrane electrode diffusion assembly for use in an ion exchange membrane fuel cell, comprising:

first, providing an ion conducting electrolyte membrane having opposite anode and cathode sides;

second, providing anode and cathode electrodes which are individually affixed on, and located at least in partial covering relation relative to the respective anode and cathode sides of the electrolyte membrane;

third, providing a first diffusion layer comprising carbon and a fluropolymer, and then heating the first diffusion layer to a temperature of about 100 degrees C. to about 500 degrees C. for a predetermined period of time in the presence of air;

fourth, affixing a discrete portion of the previously heated first diffusion layer in at least partial covering relation relative to each of the anode and cathode electrodes by the application of pressure in the amount of about 400 pounds to about 10,000 pounds per square inch of surface area of the first diffusion layer, and wherein each portion of the first diffusion layer do not touch one another;

providing a permeable substrate having a predetermined thickness dimension and opposite sides;

preparing a slurry comprising at least about 20% to about 90% by weight of a particulate carbon and a hydrophobic binding resin dispersed in a water solution, and applying the slurry to coat one of the sides of the permeable substrate;

air drying the coated side of the porous substrate, and after the step of air drying the coated side, applying additional coats of the slurry, each separated by the aforementioned air drying step, to form a second diffusion layer having a resulting hydrophobic gradient; and positioning the second diffusion layer in juxtaposed, covering relation relative to the first diffusion layer.

* * * * *

UNITED STATES PATENT AND TRADEMARK OFFICE
CERTIFICATE OF CORRECTION

PATENT NO. : 6,383,556 B2
DATED : May 7, 2002
INVENTOR(S) : David R. Lott et al.

It is certified that error appears in the above-identified patent and that said Letters Patent is hereby corrected as shown below:

Column 6,
Line 20, replace "conduction" with -- conducting --.
Line 37, replace "used" with -- use --.

Column 7,
Line 64, replace "100 C." with -- 100º C. --.

Signed and Sealed this

Fourteenth Day of January, 2003

JAMES E. ROGAN
*Director of the United States Patent and Trademark Office*